UNITED STATES PATENT OFFICE.

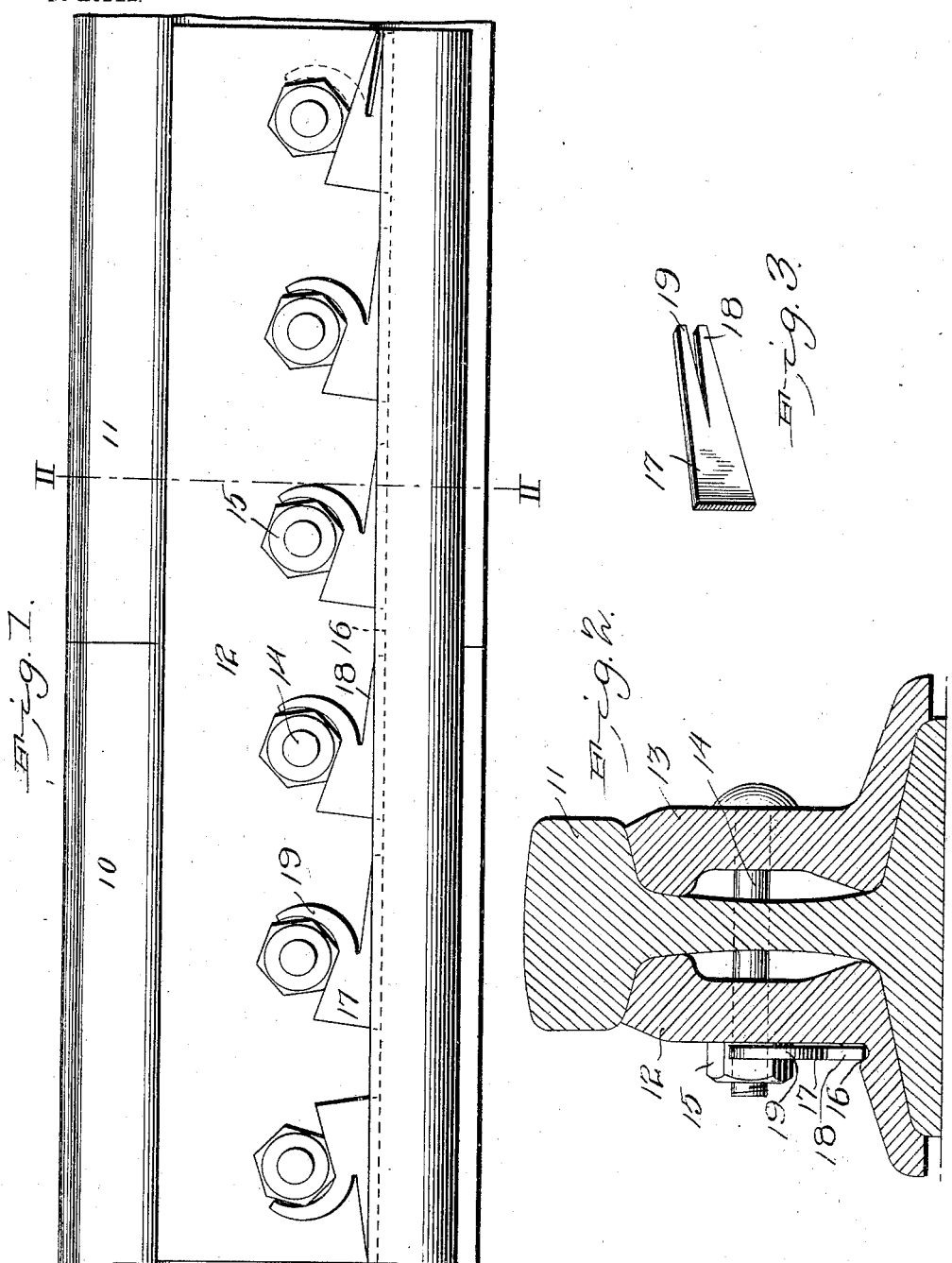

RHA P. GRIFFITH, OF TALLMAN, MICHIGAN.

NUT-LOCK.

SPECIFICATION forming part of Letters Patent No. 725,245, dated April 14, 1903.

Application filed October 15, 1902. Serial No. 127,422. (No model.)

*To all whom it may concern:*

Be it known that I, RHA P. GRIFFITH, a citizen of the United States, residing at Tallman, in the county of Mason and State of Michigan, have invented a new and useful Nut-Lock, of which the following is a specification.

This invention relates to devices employed for the purpose of preventing nuts turning backward from bolts, and may be applied in any locality requiring such devices, but is more particularly applicable to railway-rail joints.

The object of the invention is the production of a simple device which may be applied externally to the nut without altering the shape of the nut or otherwise modifying it and which will effectually lock the nut in position upon its bolt, so that it will not be loosened by any jarring or concussion to which the bolt will be subjected; and the invention consists in a wedge-key, smaller at one end than the other, preferably with the edges thereof tapered toward one end and bifurcated longitudinally, said bifurcation being formed transversely of the smaller end, said key being adapted to be inserted between the nut and a fixed support, with one leg of said bifurcated end projecting beyond the nut and forming an extended base to the wedge-key and the other leg thereof extended into engagement with the nut.

The invention further consists in a clamp-plate through which the bolts are passed transversely, the clamp-plate being provided with a longitudinal groove adjacent to the nuts, forming a support for said wedge-shaped locking-keys, said key engaging said longitudinal groove, with one of the legs of the bifurcated end projecting beyond said nut and held from lateral movement by said groove, and the other leg of said bifurcated end bent into engagement with said nut, the whole forming a simply-constructed and easily-applied nut-holding means.

Other novel features of the invention will appear in the annexed description and be specified in the claims.

In the drawings illustrative of the invention, Figure 1 is a side view of a railway-rail joint with the invention applied. Fig. 2 is a transverse section on the line II II of Fig. 1. Fig. 3 is a perspective view of one of the wedge-keys detached, showing it in the form in which it is put on the market ready for application.

The invention may be applied to any of the various forms of nut which are irregular in outline—such as square, hexagonal, or other irregular shape—and which may be applied upon any of the various structures in which nuts are employed and which require the nuts to be locked from reverse movement; but as the invention is more particularly applicable to railway-rail joints it is shown in the drawings, for the purpose of illustration, applied to an ordinary railway-rail joint, 10 11 representing the adjacent ends of two rails, 12 13 the fish-plates upon opposite sides of the vertical webs, 14 the transverse tie-bolts, and 15 the nuts, all these parts being of the usual construction with the exception of one of the fish-plates, (here shown as the plate 12,) which is provided with a longitudinal channel or groove 16, formed therein at a point below the openings through which the bolts 14 pass and extending throughout the whole length of the plate, as indicated by dotted lines in Fig. 1, the nuts 15, carried on the ends of the bolts 14, being disposed above and spaced from said groove 16.

The locking means consists in a wedge-shaped key-plate 17, bifurcated transversely at its narrow end, the two legs formed by the bifurcation being indicated at 18 19, respectively. The key-plate 17 is adapted to be inserted longitudinally by one edge in the groove 16, with its other edge in engagement with the nut 15, as shown in Fig. 1, this position placing the end 18 in advance of the nut on one side, as shown, and thereby forming an extended base to the wedge-key for a considerable distance to one side of the nut. The other leg, 19, is adapted to be bent into engagement with the nut, as shown in Figs. 1 and 2, to firmly engage the key-plate with the nut and clamp-plate and effectually lock the nut in place upon its bolt and prevent any reverse movement thereto. The member 19 may be bent very tightly into engagement with the nut by any suitable implement, such as specially-constructed pincers or wrench; but as the implement employed for the purpose of bending the leg 19 is no part of the present invention it is not illustrated. The leg 19 will be sufficiently yieldable to readily adapt itself to the outlines of the nut, but which will be sufficiently rigid when thus bent to shape to effectually resist any reverse movement of the nut. By this simple means a very efficient and secure locking means is provided, which is very easily applied and adaptable to any of the ordinary forms of nut, but, as before stated, will be found especially applicable and valuable for the purpose of locking the nuts employed in connection with railway-rail joints.

The leg 18 of the wedge-key, by which the base of the wedge-key is extended for a comparatively long distance beyond the nut, is a valuable feature of the invention and adds materially to the efficiency and increases the security of the device, as it very effectually prevents, in coaction with the bent-up leg 19, any tendency of backward movement of the nut rolling the wedge-key from beneath the nut, as it would be liable to do if the extended base-leg 18 were not present.

The wedge-keys may be inserted from either side, as is obvious, and may be manufactured and furnished very cheaply, as they can be struck up from sheet metal at one stroke of a punching-machine provided with a suitable die.

The wedge-key plate 17 may be made of any size and thickness to adapt it to nuts of various sizes and employed in various structures, and I do not, therefore, wish to be limited to any particular size of wedge-key or to one embracing any specific relative proportions.

Having thus described the invention, what is claimed is—

1. A nut-lock comprising a bolt, a nut upon said bolt, supporting means adjacent to the nut and a wedge-shaped key having a longitudinal kerf at its narrow end, said key being inserted between the supporting means and the edge of the nut, one member of the divided end of the wedge extending under the nut and forming a supporting-base and the other member of said divided end bent into contact with the edge of the nut.

2. A nut-lock comprising a bolt, a nut upon said bolt, supporting means adjacent to said nut, said supporting means being provided with a longitudinal groove, and a wedge-shaped key having a longitudinal kerf at its narrow end, said key being inserted into the groove of the supporting means engaging the edge of the nut, one member of the divided end of the wedge extending under the nut and forming a supporting-base and the other member of said divided end bent into contact with the edge of the nut.

In testimony that I claim the foregoing as my own I have hereto affixed my signature in the presence of two witnesses.

RHA P. GRIFFITH.

Witnesses:
H. G. REEK,
E. N. FITCH.